July 18, 1967   J. F. KAVINSKY   3,331,914
WATERTIGHT SEALING DEVICES FOR ELECTRICAL CABLES
Filed Sept. 24, 1965

INVENTOR
JOSEPH F. KAVINSKY

BY Shanley & O'Neil

ATTORNEY 3,331,914
**WATERTIGHT SEALING DEVICES FOR
ELECTRICAL CABLES**
Joseph F. Kavinsky, Youngstown, Ohio, assignor to The
M. & W. Electric Manufacturing Co., Inc., a corporation of Ohio
Filed Sept. 24, 1965, Ser. No. 489,963
4 Claims. (Cl. 174—65)

This invention relates to watertight sealing apparatus and more particularly to a watertight sealing device for electrical conduit passed through an aperture in a barrier.

In the installation of electrical conduit there frequently arises a need for a watertight seal at a point where the conduit passes through an aperture in a barrier. Such a situation occurs, for example, where service entrance cable passes from an area that is exposed to the weather into a protected or enclosed area such as a building or meter box. In this situation the entrance made for the cable must be made raintight. Previous attempts to solve this problem have involved the use of a rubber or neoprene gland to close the cable entrance aperture between the periphery thereof and the external surface of the cable. These attempts have failed in many instances because electrical cable varies widely in outside transverse dimension from place to place along its length. Hence it has not been possible to provide glands with openings made to fit a particular cable of nominal size and provide a watertight seal therewith with any assurance of success in every instance. Some provisions for the variance in cable dimension have been made in the design of the glands, and some are constructed so as to be compressible onto the cable. While this expedient has increased the chances of obtaining a watertight seal in any given instance it has by no means made such result a certainty. This is so because in many cases it is impossible to compress the gland to the point of being watertight, again, because of wide fluctuations in outside dimensions of the cables.

Therefore, a main object of this invention is to provide an improved watertight seal for electrical cable passed through an aperture in a barrier that overcomes the disadvantages possessed by prior art sealing devices.

Another object of this invention is to provide a seal that will be watertight irrespective of variations in external dimensions of the cable.

A further object of the invention is to provide a watertight sealing device which will adapt itself to the contours of the electrical cable and form a tenacious, waterproof seal therewith.

It is still a further object of this invention to provide a watertight seal that accomplishes all the aforementioned objects, yet is quickly and easily made and is more economical than those previously utilized.

The foregoing and other objects are accomplished by this invention, which can be briefly described as a watertight sealing device for a cable passed through a barrier structure, which comprises a mass of initially-fluid, solidifiable sealing compound annularly disposed about the cable for preventing the inflow of water into the aperture, and unique retaining cup means supported on the barrier structure for holding the sealing compound in position until it is solidified. The retaining cup used in the inventive combination has an end closure including opening means for passing the cable therethrough. Disposed at the opening means are means contacting the cable for preventing the flow of any appreciable amount of sealing compound through the opening means.

The sealing compound, which preferably is a reaction-setting resinous composition to be more fully described later, adapts itself to the contours of the electrical cable and the barrier structure and forms a tenacious bond therewith that will prevent seepage of water into the aperture through which the cable penetrates the barrier structure. The bond forms a seal that will be waterproof irrespective of variations in cable dimensions.

These and other features, objects and advantages of the invention will appear more fully from the following detailed description which, when considered in conjunction with the accompanying drawings, discloses several embodiments of the invention for purposes of illustration only and not for definition of the limits of the invention. For the purpose of determining the scope of the invention, reference may be had to the appended claims.

In the drawings, wherein similar reference characters denote similar elements throughout the several views.

Figure 1:
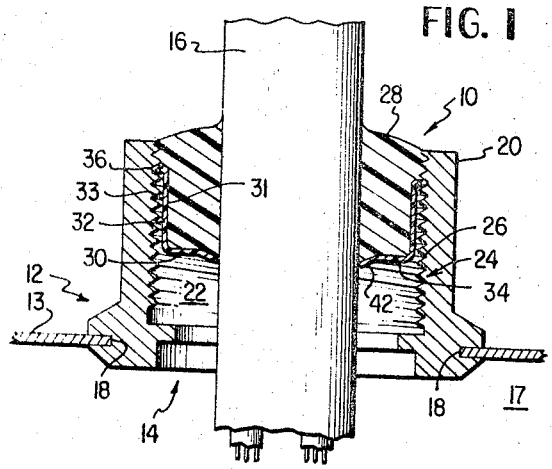
FIGURE 1 is a view in partial vertical section of a sealing device made in accordance with the principles of the invention.

Referring to the drawings in greater detail, in FIGURE 1 the novel sealing device made in accordance with the principles of the invention is generally indicated at 10 and shown fully assembled, sealing a cable entrance aperture, generally indicated at 14, in a barrier structure, indicated generally at 12. In FIGURE 1, the barrier structure 12 comprises a wall 13 and a hollow member 20, the latter to be more fully described hereinbelow. The periphery of aperture 14 in barrier structure 12 is shown at 18. An electrical cable 16 is shown in place in the assembly and passing into confined area 17. Hollow member 20, which in the embodiment illustrated in FIGURE 1 takes the form of a metal conduit hub, surrounds the periphery 18 of the aperture 14 in sealed engagement with the wall 13 and extends therefrom to define a hollow enclosure 22. The hollow member 20 has an inner periphery shown generally at 24 which may be provided with recesses or cavities which in the embodiment shown in FIGURE 1 are provided by threads 26 to serve one or more of several purposes to appear shortly. A mass 28 of initially-fluid, solidifiable, sealing compound extends from the external surface of cable 16 to the inner periphery 24 of the hollow member 20, thereby preventing the inflow of water into aperture 14.

Since the mass 28 of sealing compound is in the fluid state when it is initially disposed in the assembly 10, a retaining cup means 30 is provided to hold the sealing compound in position until it is solidified. The retaining cup means 30 is of unique configuration and has a hollow body portion 32 which has inner and outer peripheries 31 and 33 respectively. Although cup means 30 may be supported on hollow member 20 in any convenient manner, flange means such as are indicated at 36 are advantageously provided on the outer periphery 33 of the hollow body portion 32, for supporting the cup on hollow member 20.

Figure 2:
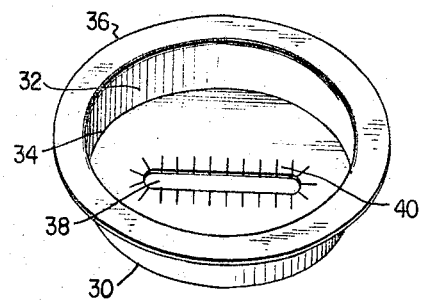
FIGURE 2 is a perspective view of a retaining cup means used in a sealing device made pursuant to the principles of the invention.

At one end of the hollow body portion 32, cup means 30 is provided with a closure 34. In order to pass cable 16 through the cup 30, the end closure 34 thereof is constructed with an opening 38 as best shown in FIGURE 2. The configuration of the opening 38 will be generally that of the cable which is to be passed through it and although in the illustrated embodiments an opening 38 of generally oval configuration is shown, made to fit generally oval-shaped cable 16, the use of openings and cables of any configuration is within the contemplation of the invention.

End closure 34 of cup 30 is provided with means contacting the cable for closing or substantially closing the opening means between the periphery thereof and the external surface of the cable, for preventing the flow of any appreciable amount of sealing compound through the opening means. In the embodiment illustrated in the drawings, these means take the form of tabs or flap means 40 which open up as at 42 in FIGURES 1 and 4 to admit cable 16, yet cling thereto in order to close or substantially close opening 38 between the periphery thereof and the external surface of the cable against the flow of any appreciable amount of sealing compound through the opening 38. It will be observed that the flaps 40 permit the use of cables of a plurality of sizes in a retaining cup of a single nominal size.

Cup 30 may be constructed of a rigid material, but is preferably manufactured from a flexible material such as rubber, plastic, neoprene, or light gauge metal. In the former case, and when flaps are provided, the only limitation on rigidity is that the flaps must yield to admit the cable, at which point they will yield no farther, due to the rigidity of the material. When a flexible material is used, it must possess sufficient elasticity to insure that the flaps cling to the cable.

In making and using the sealing device which is the embodiment of the invention illustrated in FIGURE 1, the electrical cable 16 may first be passed through opening 38 in retaining cup 30, then through the aperture 14. The retaining cup 30 may then be passed up the cable so as to extend between the external surface of the cable 16 and the inner periphery 24 of the hollow member 20 in the manner shown in FIGURE 1. It is readily apparent that the retaining cup 30 may be arranged in the hollow member first and the cable 16 then passed through opening 38 and aperture 14. In any event, the fit between the retaining cup 30 and the inner periphery of hollow member 20 must be sufficiently tight as to prevent flow of any appreciable amount of sealing compound past the retaining cup.

The sealing compound in a fluid state, usually of relatively high viscosity, is then placed in the retaining cup 30 to extend from the external surface of the cable 16 at least to the inner periphery 24 of the hollow member 20. The mass of sealing compound will adapt itself to the contour of the external surface of the cable 16 and the inner periphery 24 of the hollow member 20 to form a watertight bond therewith irrespective of variations in such contours. In so doing, the sealing compound will provide a waterproof seal that will prevent inflow of water into the aperture 14. When the sealing compound solidifies, it forms a tenacious waterproof bond with the external surface of the cable 16 and the inner periphery 24 of the hollow member 20 that is permanent, yet is quickly, easily and economically made. Since the retaining cup 30 has become an integral part of the sealing device 10, there is no necessity for returning to the site to remove it.

Although the cup 30 may be supported on the hollow member 20 in any convenient manner and still be within the contemplation of the invention, recesses such as those provided by threads 26 on the inner periphery 24 of hollow member 20 are advantageously present in that they serve to engage the sealing compound so as to assist inadvertent disengagement of the cable after solidification. They also serve to support the retaining cup 30, and to assist in preventing flow of sealing compound past the cup 30.

Figure 3:
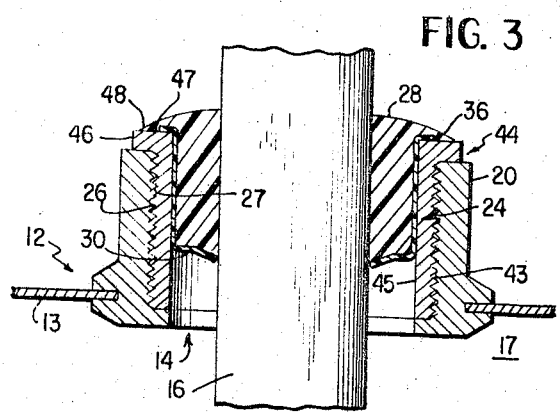
FIGURE 3 is a partial vertical sectional view of another sealing device made in accordance with the principles of the invention.

The embodiment of the invention illustrated in FIGURE 3 utilizes a hollow fitting, generally indicated at 44, disposed between the retaining cup 30 and the hollow member 20. In the drawing, hollow fitting 44 is of generally tubular configuration and has a flange 46 at one end thereof, an inner periphery 45 and an outer periphery 43. The fitting 44 is adapted for removable sealable engagement with hollow member 20. This is accomplished in the embodiment shown in FIGURE 3 by the use of mating threads 26 on the inner periphery 24 of hollow member 20 and threads 27 on the outer periphery 43 of fitting 44. The retaining cup 30 is supported in this embodiment on fitting 44 in any convenient manner. The particular support arrangement illustrated in FIGURE 3 utilizes end 47 of fitting 44 for the support of flange 36 of the retaining cup 30. It will be apparent that the use of a hollow fitting 44 removably engageable with the inner periphery of the hollow member 20 is advantageous in that it permits the withdrawal of the conduit with seal intact without damage to any of the apparatus involved.

In FIGURE 3, the mass 28 of sealing compound extends from the external surface of cable 16 to the inner periphery of the retaining cup 30 and must extend as shown at 48 past the end of flange 36 onto the end 47 of fitting 44 to prevent water from seeping into aperture 14 between the retaining cup 30 and the fitting 44.

Figure 4:
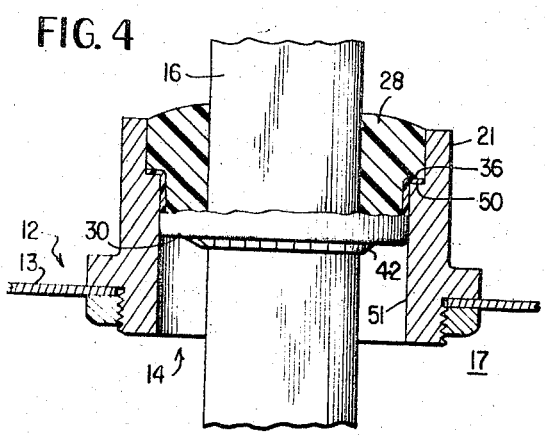
FIGURE 4 is an elevational view, partially in section, of still another sealing device made in accordance with the principles of the invention.

In the embodiment of the invention illustrated in FIGURE 4, the retaining cup 30 is supported directly on hollow member 20 by means of shoulder 50, disposed on the inner periphery 51 of hollow member 21. As shown in FIGURE 4, flange 36 of retaining cup 30 bears on shoulder 50. The mass 28 of sealing compound extends from the external surface of the cable 16 at least to the inner periphery 51 of the hollow member 21 and thereby prevents the inflow of water into aperture 14.

Figure 5:
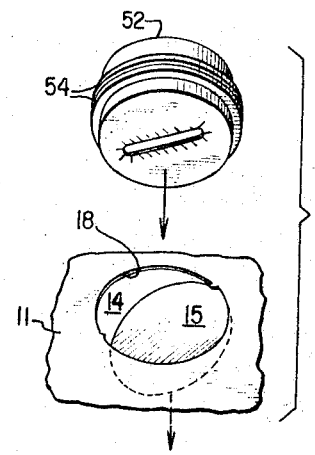
FIGURE 5 is a perspective view of a modified form of retaining cup means, shown in place before a knock-out aperture.
Figure 6:
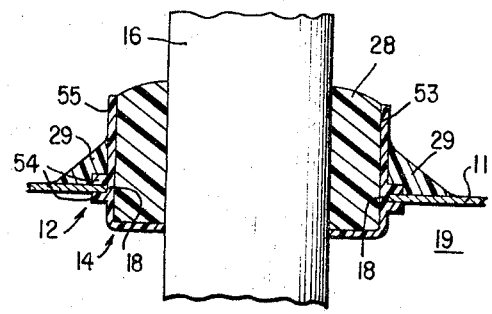
FIGURE 6 is a view in vertical section of the retaining means of FIGURE 5, shown in place in the knock-out aperture.

FIGURES 5 and 6 illustrate a modified form of retaining cup usable for barrier structures which are not constructed with a hollow member such as that provided at 20 in the preceding figures. In FIGURES 5 and 6, the barrier structure comprises a wall 11 of an electrical fixture housing having a conventional knockout portion 15, provided for admission of electrical cable into the area 19 confined by the housing. In this modified form, the retaining cup 52 is provided at the outer periphery of its tubular body portion 55 with flange means 54 which are adapted for sealable engagement, as by snap-action, with the periphery 18 of aperture 14 in barrier structure 12. Mass 28 of sealing compound is disposed between the external surface of cable 16 and the inner periphery 53 of retaining cup 30. Another mass 29 of sealing compound may be placed over the engagement of flange 54 with the periphery 18 of aperture 14 to insure a watertight seal at this location.

The particular sealing compound to be used in this invention may be of any type that is fluid or semi-fluid when applied, then solidifies to form a permanent watertight bond. Thermoplastic and thermosetting compositions are useful under certain conditions, but it is preferred to employ reaction-setting liquid resinous compositions because of the greater convenience thereof. One such reaction-setting compound consists of a liquid epoxy resin and a hardening agent or activator therefor. A typical, commercially available example of an epoxy resin usable in this invention is "Epon" resin #562, "Thiokol" polymer LP–2 is a commercial example of a liquid polythiopolymercaptan polymer suitable for use as a hardening agent or activator for the resin, when the polymer is mixed with a liquid polyamine such as 2,4,6-tri(dimethylaminomethyl) phenol. Most advantageously, the polyamine and the polymer are maintained in liquid admixture in one side of a flexible plastic bag. The resin is maintained in liquid form in the other side thereof, kept separate from the hardening agent mixture by a separator clip. When a seal is to be made, the separator clip is removed from the plastic bag and the resin and its hardening agent are mixed within the sealed bag. When the sealing compound has been prepared, the seal of the bag is broken and the resinous material is applied in the manner hereinbefore set forth.

Although it will be apparent that the invention finds utility in any situation wherein a watertight seal must be made around an electrical cable passing through an aperture in a barrier structure, it will be observed that the inventive sealing device disclosed herein finds particular utility in the waterproofing of apertures formed in the passing of electrical service entrance cable through a wall into a building or through a meter box housing into a meter box enclosure.

What I claim is:
1. A watertight sealing device, comprising
   a container for electrical apparatus including a wall having an aperture therein,
   a rigid sleeve member sealably secured to the wall, surrounding the aperture and extending outwardly from one side of the wall to a free end portion,
   an electrical cable extending through the sleeve member from one side of the wall to the other side of the wall,
   the electrical cable having a cross-sectional area substantially less than the cross-sectional area of the sleeve member,
   a flexible retaining cup located within the sleeve member and surrounding the cable,
   the flexible retaining cup being preformed and including a hollow body portion having a closed side wall spaced from the outer periphery of the cable and extending generally parallel to the inner periphery of the rigid sleeve member throughout a substantial portion of the length of the rigid sleeve member, the hollow body portion also having an open end, a closure at the other end of the hollow body portion, an opening in the closure for passing the cable through the closure, a plurality of slits in the closure around the periphery of the opening, the portions of the closure between the slits forming a plurality of flaps contacting the cable and yieldable out of the plane of the closure to permit passage of a cable larger than the opening, and an outwardly extending annular flange disposed on the outer periphery of the hollow body portion and supported on the rigid sleeve member in spaced relation with the wall of the container,
   the flexible retaining cup forming an annular cavity about the cable, the cavity having a closed end adjacent the wall and an open end spaced outwardly from the wall, and
   a mass of initially-fluid, hardened and solidified reaction-setting sealing compound filling the cavity, conformed to the contours of the outer periphery of the cable and forming a permanent waterproof bond therewith, engaging the rigid sleeve member, conformed to the contours thereof and forming a permanent waterproof bond therewith,
   the mass of sealing compound being uncompressed and having a surface exposed to the area outside the confines of the container,
   the flexible retaining cup holding the mass of sealing compound in position until solidified, the flaps contacting the cable preventing flow of any appreciable amount of sealing compound through the opening in the flexible retaining cup.

2. A watertight sealing device as defined in claim 1, and further comprising,
   a plurality of screw threads carried by the inner periphery of the rigid sleeve member along at least a portion of its length,
   at least one of the screw threads engaging and supporting the outwardly extending annular flange on the retaining cup,
   the mass of sealing compound engaging a plurality of the screw threads, conformed to the contours thereof and forming a permanent waterproof bond therewith.

3. A watertight seal as defined in claim 1, wherein the rigid sleeve member includes
   a rigid hollow member sealably secured to the wall, surrounding the aperture and extending outwardly from one side of the wall to a free end, and having an inner periphery carrying screw threads along at least a portion of its length,
   a rigid hollow fitting having an outer periphery in sealed, threaded engagement with the inner periphery of the hollow member, the hollow fitting also having an outer peripheral flange located at one end of the hollow fitting and projecting laterally over the free end of the hollow member,
   the annular flange on the retaining cup projecting over the flange on the hollow fitting,
   the flange on the hollow fitting engaging and supporting the annular flange on the retaining cup,
   the mass of sealing compound extending over the flange on the retaining cup and engaging the flange on the hollow fitting, and forming a permanent waterproof bond therewith.

4. A watertight sealing device as defined in claim 1, wherein the rigid sleeve member has a larger inside diameter at its free end portion than at its other end portion, and the inner periphery of the rigid sleeve member carries a shoulder at a location between the ends of the sleeve member and spaced from the wall of the container,
   the shoulder engaging and supporting the annular flange on the flexible retaining cup,
   the mass of sealing compound engaging the inner periphery of the rigid sleeve member at the end portion of the rigid sleeve member having the larger inside diameter, conformed to the contours thereof and forming a permanent, waterproof bond therewith.

References Cited
UNITED STATES PATENTS
| | | | |
|---|---|---|---|
| 2,258,941 | 10/1941 | Wayman | 285—158 |
| 2,264,489 | 12/1941 | Tiegler et al. | |
| 2,339,187 | 1/1944 | Pain | 248—314 |
| 3,210,608 | 10/1965 | Appleton. | |

FOREIGN PATENTS
262,532  12/1926  Great Britain.

OTHER REFERENCES
Bartsch: German app. No. 1,090,737, publ. Oct. 13, 1960.

LARAMIE E. ASKIN, *Primary Examiner.*